United States Patent Office 3,692,635
Patented Sept. 19, 1972

3,692,635
PROCESS FOR SEPARATING HALOGENATED HYDROCARBONS BY EXTRACTIVE DISTILLATION
George B. Fozzard, % Phillips Petroleum Co., Bartlesville, Okla. 74003
No Drawing. Filed May 19, 1971, Ser. No. 145,050
Int. Cl. B01d 3/40; C07c 19/08
U.S. Cl. 203—62                        4 Claims

ABSTRACT OF THE DISCLOSURE

A process for separating 1,1,2-trichlorotrifluoroethane from a first mixture consisting essentially of 1,1,2-trichlorotrifluoroethane and 1,2-dichloro-1,1-difluoroethane by adding a cycloalkanone to the first mixture to form a resultant second mixture and thereafter extractively distilling the second mixture in an extractive distillation zone to separate the 1,1,2-trichlorotrifluoroethane from the 1,2-dichloro-1,1-difluoroethane.

---

This invention relates to the separation of halogenated hydrocarbons from a first mixture and, more particularly, to a process for separating 1,1,2-trichlorotrifluoroethane from a mixture of 1,1,2-trichlorotrifluoroethane and 1,2-dichloro-1,1-difluoroethane.

In order to simplify the description of this process, 1,1,2-trichlorotrifluoroethane is hereafter referred to as 113 and 1,2-dichloro-1,1-difluoroethane is hereafter referred to as 132b.

In various hydrocarbon processes known in the art, mixtures of 113 and 132b are formed. It sometimes then becomes advantageous to separate the halogenated hydrocarbons of the mixture for recovering the valuable constituents or for further processing. An example source of the 113–132b first mixture is formed as a product of the electrochemical fluorination of ethylene dichloride. The process of electrochemical fluorination of ethylene dichloride is known in the art and is not a part of this application, and it should be understood that the halogenated hydrocarbon separation process of this invention can be utilized without regard to the process by which the halogenated hydrocarbons were admixed to form the first mixture.

In their separate and pure state, the constituents of the first mixture have boiling points and a relative volatility at atmospheric pressure as follows:

| Constituent | Boiling point, °C. | Relative volatility, 113/132b |
|---|---|---|
| 113 | 47.6 | 1.01 |
| 132b | 46.8 | |

The above tabulation indicates that it is next to impossible to separate 113 and 132b by ordinary distillation because of the close boiling points and attendant low value of relative volatility. Value of the relative volatility must generally be 1.1 or higher before separation by ordinary distillation is economical in a commercial operation. When the relative volatility drops much below 1.1, industry generally resorts to extractive or azeotropic distillation by which means extraneous agents are added to the system to be separated to effect an increase in the relative volatility.

To illustrate that cyclohexanone is an effective agent for increasing the volatility of 113 relative to 132b by an extractive distillation process, mixtures of 113 and 132b containing 60 mol percent of cyclohexanone were equilibrated, the resulting liquid and vapor phases sampled and analyzed, and a relative volatility of 2.6 calculated by standard procedures. This demonstrated that cyclohexanone should be a very desirable selective solvent for use in separating 113 and 132b by extractive distillation.

As additional confirmation of the operability of the cyclohexanone extractive distillation process for the continuous separation of 113 and 132b, a laboratory distillation column was operated continuously with a mixture of 113–132b passed to the middle and cyclohexanone passed to the top. The column was 14 mm. in diameter and contained 8 feet of packing with the 113–132b feed mixture passed to a midpoint of the packed section. The packing consisted of 6 mm. by 6 mm. Raschig rings. An electrically heated kettle was provided at the bottom and conventional condenser and reflux facilities at the top.

During one test of the separation process, the following data were taken after steady state conditions were reached:

Feed rates:
    113–132b feed _____ 6.2 cc./min.
    Cyclohexanone _____ 6.2 cc./min.
Temp., ° C.:
    Top of column _____ 87–90° C.
    Kettle _____ 112° C.
    113–132b feed _____ 80° C.
    Cyclohexanone _____ 60° C.
Compositions by gas-liquid chromatography:
    113–132b feed _____ 38.9 mol percent 113.
                             61.1 mol percent 132b.
    Overhead product _____ 98.5 to 99.0 mol percent 113.
                             0.8 to 0.7 mol percent 132b.
                             0.7 to 0.2 mol percent cyclohexanone.
    Kettle product _____ 1.35 mol percent 113.
                             8.75 mol percent 132b.
                             89.90 mol percent cyclohexanone.

It was thus demonstrated that high purity 113 could be separated overhead by extractive distillation of a 113–132b mixture using cyclohexanone as selective solvent.

In another test of the separation process, the column was operated under the same conditions as in the first test described above except that the kettle temperature was increased from 112° C. to 145° C. in an attempt to obtain a higher purity 132b kettle product. The following products were obtained:

Overhead:                                         Mol percent
    113 _____ 90.2
    132b _____ 8.8
    Cyclohexanone _____ 0.7
Kettle:
    113 _____ 0.4
    132b _____ 6.6
    Cyclohexanone _____ 93.0

Purity of the 132b kettle product on a cyclohexanone-free basis was thus 6.6/7.0=94 mol percent. It was thus demonstrated that both components can be separated in relatively high purity by extractive distillation using cyclohexanone as solvent. In a commercial operation, a column with additional height (more separation efficiency) would be used and thus both 113 and 132b would be obtained simultaneously in the high purity state.

It was also demonstrated that 132b is easily separated from cyclohexanone (the kettle product) by ordinary distillation. This permits recycle of the cyclohexanone to the top of the column.

The commercial extractive distillation column is operated according to conventional procedures, i.e., the 113/

132b mixture is fed to the center of a bubble tray-equipped fractionator containing approximately 50 trays. Cyclohexanone is fed to the top of the fractionator and passes downwardly as a liquid through the trays to the bottom. The 113 being more volatile than 132b in the presence of the solvent passes in the relatively pure state from the top of the fractionator where it is condensed, part returned as reflux, and the remainder taken as high purity 113 product. The bottoms stream from the fractionator consists of a mixture of cyclohexanone and 132b. This mixture is passed to a second fractionator or stripper for separation of 132b and cyclohexanone, an easy separation because of the wide separation in boiling points. The recovered cyclohexanone is recycled to the top of the extractive distillation column. The 132b is recovered as high purity product. The extractive distillation column operates at about 25 p.s.i.a. pressure and at a temperature of between about 100 and about 200° F. The stripper operates at about 50 p.s.i.a. with a bottoms product temperature of about 400° F.

While cyclohexanone is the preferred solvent, other cyclohexanones can be used such as, for example, cyclobutanone, cyclopentanone, cycloheptanone, cyclooctanone, and the lower alkyl derivatives of the above such as 2-methylcyclohexanone, 3-methylcyclohexanone, 2,5-dimethylcyclohexanone, 3-butylcyclohexanone, etc. The alkyl group will preferably contain not more than 4 carbon atoms. Mixtures of the cycloalkanones may also be used.

Other modifications and alterations of this invention will become apparent to those skilled in the art from the foregoing discussion and examples and it should be understood that this invention is not to be unduly limited thereto.

What is claimed is:

1. A process for separating 1,1,2-trichlorotrifluoroethane from a first mixture of trichlorotrifluoroethane and 1,2-dichloro-1,1-difluoroethane, comprising:
    adding a cycloalkanone to the first mixture for forming a resultant second mixture;
    separating 1,1,2-trichlorotrifluoroethane from the 1,2-dichloro-1,1-difluoroethane of said second mixture by extractively distilling the second mixture in an extractive distillation zone and thereby recovering, as overhead product, a purified 1,1,2-trichlorotrifluoroethane stream and as kettle product, 1,2-dichloro-1,1-difluoroethane and cycloalkanone.

2. A process, as set forth in claim 1, wherein the cycloalkanone is cyclohexanone.

3. A process, as set forth in claim 1, including separating 1,2-dichloro-1,1-difluoroethane from the cycloalkanone by distilling the kettle product mixture.

4. A process, as set forth in claim 3, including recycling the separated cycloalkanone for mixing with other first mixtures.

References Cited

UNITED STATES PATENTS

| | | | |
|---|---|---|---|
| 2,442,589 | 6/1948 | Evans et al. | 203—62 |
| 3,004,075 | 10/1961 | Marcali | 260—653 |
| 3,282,801 | 11/1966 | Wiist | 203—62 |
| 3,391,201 | 7/1968 | Jaeger | 203—58 |
| 3,449,218 | 6/1969 | Jaeger | 203—58 |
| 3,620,941 | 11/1971 | Ruehlen | 204—59 R |

WILBUR L. BASCOMB, JR., Primary Examiner

U.S. Cl. X.R.

203—84; 204—59 R; 260—653 R

UNITED STATES PATENT OFFICE

CERTIFICATE OF CORRECTION

Patent No. 3,692,635  George B. Fozzard  Dated: Sept. 19, 1972

It is certified that error appears in the above-identified patent and that said Letters Patent are hereby corrected as shown below:

Column 1, line 6, there should be a line inserted reading

-- Assignee: Phillips Petroleum Company --.

Signed and sealed this 17th day of April 1973.

(SEAL)
Attest:

EDWARD M. FLETCHER, JR.
Attesting Officer

ROBERT GOTTSCHALK
Commissioner of Patents